Patented Jan. 13, 1942

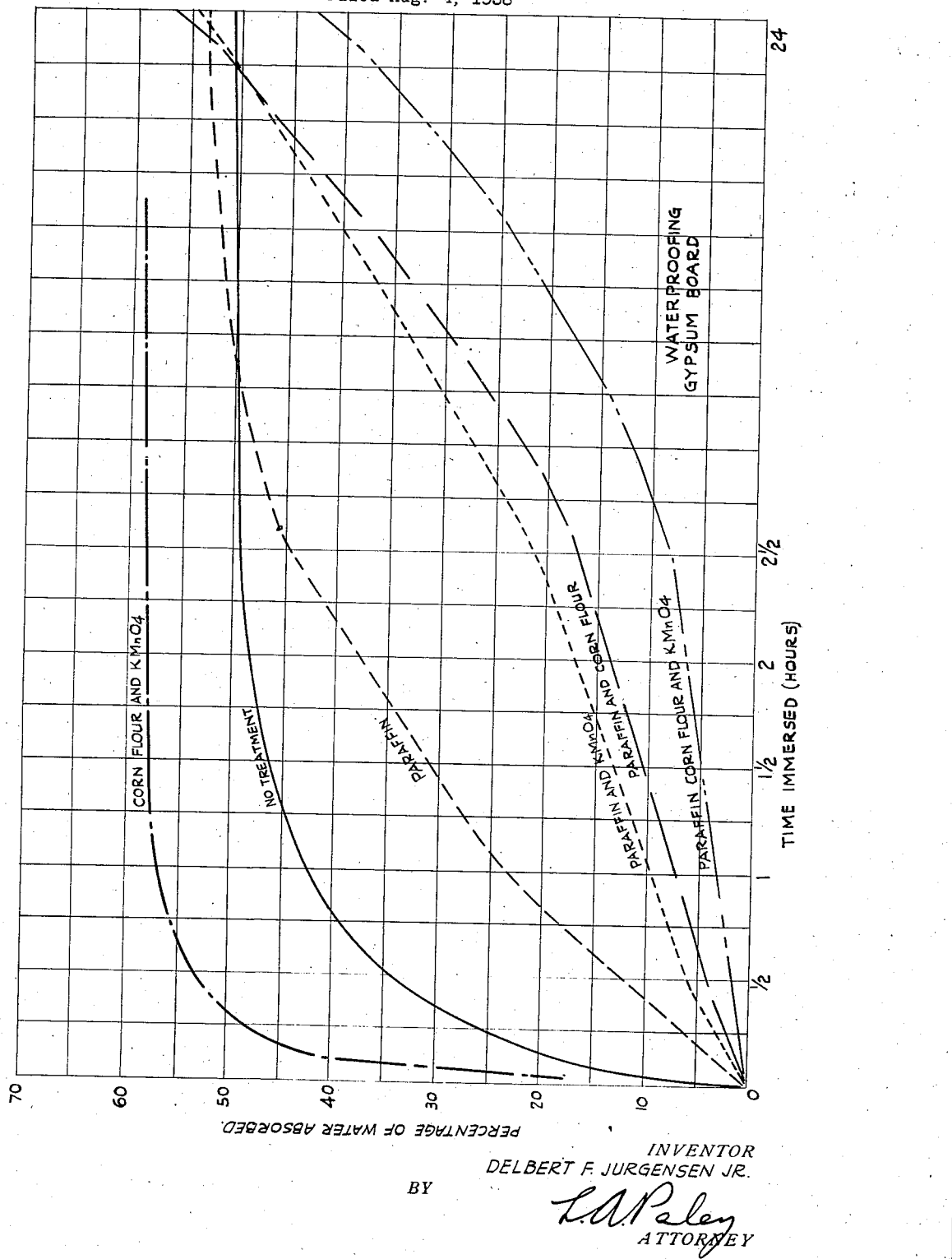

2,269,457

UNITED STATES PATENT OFFICE 2,269,457

WATER RESISTANT COMPOSITION BOARD

Delbert F. Jurgensen, Jr., Chicago, Ill., assignor to United States Gypsum Company, Chicago, Ill., a corporation of Illinois Application August 4, 1938, Serial No. 222,968

6 Claims. (Cl. 106—114)

This invention relates to water-resistant composition boards or other shapes.

Many articles of commerce are made up in whole or in part of cementitious materials, such as gypsum. For example, the wallboard or plasterboard industry is one of large size and yearly turns out millions of square feet of board, generally consisting of a core of gypsum and added ingredients, covered by paper liner sheets. In most of these uses, the product as made from cementitious materials such as gypsum, is not as satisfactory as it might be because of the fact that the cementitious material is weakened by exposure to water or water vapor. Many attempts have been made to overcome this weakness of gypsum and similar cementitious materials on exposure to water by incorporating materials such as paraffin, asphalt, waxes, etc., into the mix, but these attempts have been only partially successful in that the product still remains excessively water absorbent and is still weakened by water. Others have attempted to produce a waterproof product by coating the product with a waterproof material such as asphalt, paint, varnish, etc.

The object of this invention therefore, is to produce a composition board which has been made water resistant by the inclusion in the mix of suitable materials.

Reference is to be had to the accompanying drawing forming a part of this specification, in which the figure is a graphical representation of the effects of the different ingredients on the water resistance of gypsum board.

I have discovered that the introduction into the mix of materials such as paraffin, together with materials such as corn flour, and materials such as potassium permanganate will result in a product having a markedly decreased rate of water absorption.

For purposes of illustration, I will describe the application of my discovery to the manufacture of a water resistant plasterboard. However, nothing that appears herein is to be taken to limit the discovery to plasterboard, since obviously it is equally applicable to all forms, shapes and kinds of gypsum products, and to products made from other cementitious materials. It has been found, however, that this process is of particular efficacy where the cementitious material is covered with cellulosic liners, such as paper.

To show the benefit of my discovery a "water absorption on immersion" test may be used. When plasterboard is to be tested, a 6" x 6" sample is cut from the center of the board, weighed, and immersed in water at 65° F. The sample is removed from the water, wiped dry and weighed at ½ hour intervals for several hours, then again after 24 hours immersion. The results are reported as percent increase in weight, based on the original dry weight of the sample.

My discovery may be applied to the manufacture of plasterboard as follows. Paraffin or its equivalent, is added to the slurry in amounts varying from approximately ½% to 15% of the weight of dry stucco. The paraffin may be added to the mix in numerous ways; for example it may be melted and sprayed into the mixer, or it may be powdered and mixed with the dry stucco. Corn flour, or other hydrophilic material, is added to the slurry in amounts varying from 0.2% to 15% of the weight of dry stucco. The corn flour or its equivalent is first cooked, to form a solution, the concentration of which may vary over wide ranges depending upon the viscosity desired in the cook, the amount of corn flour or equivalent being used, and the method used for introducing the cooked solution into the mix, which latter may be done conveniently by metering it into the gaging water before the gaging water enters the mixer. Potassium permanganate or its equivalent, is added to the slurry in amounts varying from 0.1% to 10% of the weight of dry stucco. The potassium permanganate may be added in many different ways; for example it may be dissolved in the gaging water, or mixed dry with the stucco. The slurry is mixed in the conventional mixers, and formed into plasterboard or wallboard in the usual way.

The amount of the different added ingredients to be used in any one case will depend entirely on the product desired, and on the various equivalents used in place of the ingredients mentioned above. For example, a standard ⅜" 1450 lbs./M sq. ft. wallboard with a gypsum core has a one hour water absorption of approximately 45%. The addition of 6% paraffin will reduce the one hour water absorption to approximately 25%. The further addition of 1% of cooked corn flour will reduce the one hour absorption to approximately 10%. The addition of 1% of potassium permanganate in place of the cooked corn flour, gives a one hour absorption of approximately 10%. The use of 6% paraffin, 1% corn flour and 1% potassium permanganate will give a one hour absorption of approximately 3%. Obviously, the proportion of each of the three ingredients which will be used in any one case will depend upon the properties desired in the product, the character of the cementitious material and fillers used, the cost of the ingredients, etc., i. e. the proportion of each ingredient will be so chosen as to obtain the desired product at a minimum cost. In any particular case the optimum quantities of each ingredient for best results should be determined by experiment.

In the graphs shown in the drawing, the waterproofing effects of the different ingredients is clearly shown. In the curves, the amount of each ingredient per 1000 sq. ft. of ⅜ inch, 1450 lb. board was as follows:

|  | Board | Dry stucco |
|---|---|---|
|  | Lbs./M sq. ft. | Percent of weight |
| Paraffin | 60 | 5.7 |
| KMnO₄ | 7 | 0.67 |
| Corn flour | 13 | 1.24 |

I have also discovered that the amount of accelerator used in preparing a stucco slurry has a distinct effect on the water resistance of the product. The less the amount of accelerator, the more water-resistant the product. For example, the usual plasterboard stucco slurry with 6% paraffin, 0.7% potassium permanganate, and 2% corn flour added, with no accelerator will give a plasterboard having a 24 hour absorption of approximately 35%. When 1% accelerator is added to the above slurry, a product having a 24 hour absorption of approximately 55% is obtained. A similar difference is also noticeable in the one hour absorption, but, of course, much less in amount.

Many equivalents for the three above mentioned ingredients may be used. As equivalents for the paraffin there may be used various mixtures of asphalt and paraffin, various waxes, asphalt, etc. As equivalents for potassium permanganate, almost any water soluble electrolyte may be used, such as ammonium chromate, potassium dichromate, potassium chlorate, sodium chloride, tannic acid, sodium acetate, etc. As equivalents for the corn flour, almost any flour or starchy product may be used such as the various corn starches, gums or dextrins, acid cooked flour, wheat flour, etc. Bentonite can also be used instead of corn flour.

It has been found preferable to use processed flours or starches containing larger proportions of water soluble materials since they are more effective in imparting water resistance. The particular materials to be used in any one product for the best results have to be determined by a consideration of the qualities desired in the product, the cementitious material and other ingredients used, and the cost of the materials where used. For example, in very light weight plasterboards, ammonium chromate seems to be much more effective than potassium permanganate or sodium chloride, while in ⅜" 1500 lb. plasterboard not much difference can be found between the mentioned materials.

I cannot account for the behavior of this three component waterproofing system. However, in attempting to explain this phenomena and without being bound by said explanation, it is believed that the soluble ingredients such as tannic acid, sodium chloride, sodium acetate, potassium permanganate, with or without the colloidal matter, act to reduce the surface tension of the molten paraffin present in the plasterboard core when the latter is subjected to heat in the drying kiln. It is believed that under the influence of heat in the drying kiln, the salts and the colloids migrate to the surface, with the water being evaporated, and as they migrate they reduce the surface tension of the molten paraffin which is following the water as it recedes from the interior, resulting in better dispersion of the paraffin. The paraffin spreads more uniformly on the crystals of gypsum and provides a more effective waterproofing coating.

It should also be noted that the more soluble matter present in the starch, the greater the water resistance. A possible explanation for this action might be that the water soluble portion of the starch has a greater effect on the surface tension of the paraffin, resulting in better dispersion of the paraffin.

It is seen that I have discovered a means for producing water resistant cementitious products like gypsum, Portland cement-asbestos, 85% magnesia, etc. While the invention has been described with reference to a specific composition and proportions and certain definite characteristics have been attributed to this product, yet I do not wish to be strictly limited thereto, as the invention can be applied equally effectively to other materials, and still be within the scope of the invention as defined in the appended claims.

Having thus described my invention, I claim as new and desire to secure by Letters Patent:

1. A gypsum board having a core containing approximately 92% set-hardened gypsum, 6% paraffin, 1% corn flour and 1% potassium permanganate, said board being characterized by a water absorption after 1 hour immersion of about 3%.

2. A water repellant composition of matter comprising a major proportion by weight of set-hardened gypsum having incorporated therewith between 0.2% and 15% of a hydrophilic colloidal substance, between 0.5% and 15% of a waterproofing substance, and between 0.1% and 10% of a water soluble electrolyte.

3. A set-hardened gypsum wallboard core composition which comprises a major proportion by weight of set-hardened gypsum, between 0.2% and 15% of a hydrophilic colloid, between 0.5% and 15% of a waterproofing substance, and between 0.1% and 10% of an electrolyte.

4. A set-hardened composition of matter which comprises between 0.2% and 15% of starch, between 0.1% and 10% of an electrolyte, and between 0.5% and 15% of paraffin intimately admixed with a major proportion by weight of set-hardened gypsum.

5. A water repellant gypsum wallboard core composition comprising a major proportion by weight of set-hardened gypsum, between 0.2% and 15% of pre-cooked corn starch, between 0.5% and 15% of paraffin, and between 0.1% and 10% of potassium permanganate.

6. A method of preparing a water repellant, set-hardened gypsum mass which comprises thoroughly mixing calcined gypsum, a hydrophilic colloidal substance, a waterproofing agent, an electrolyte, and water in sufficient amount to form a plastic mass, shaping said mass, and hardening the same, the amounts of solid ingredients being so proportioned that the resulting product contains a major proportion by weight of gypsum, between 0.2% and 15% of colloidal substance, between 0.5% and 15% of waterproofing agent, and between 0.1% and 10% of electrolyte.

DELBERT F. JURGENSEN, Jr.